Patented Oct. 19, 1937

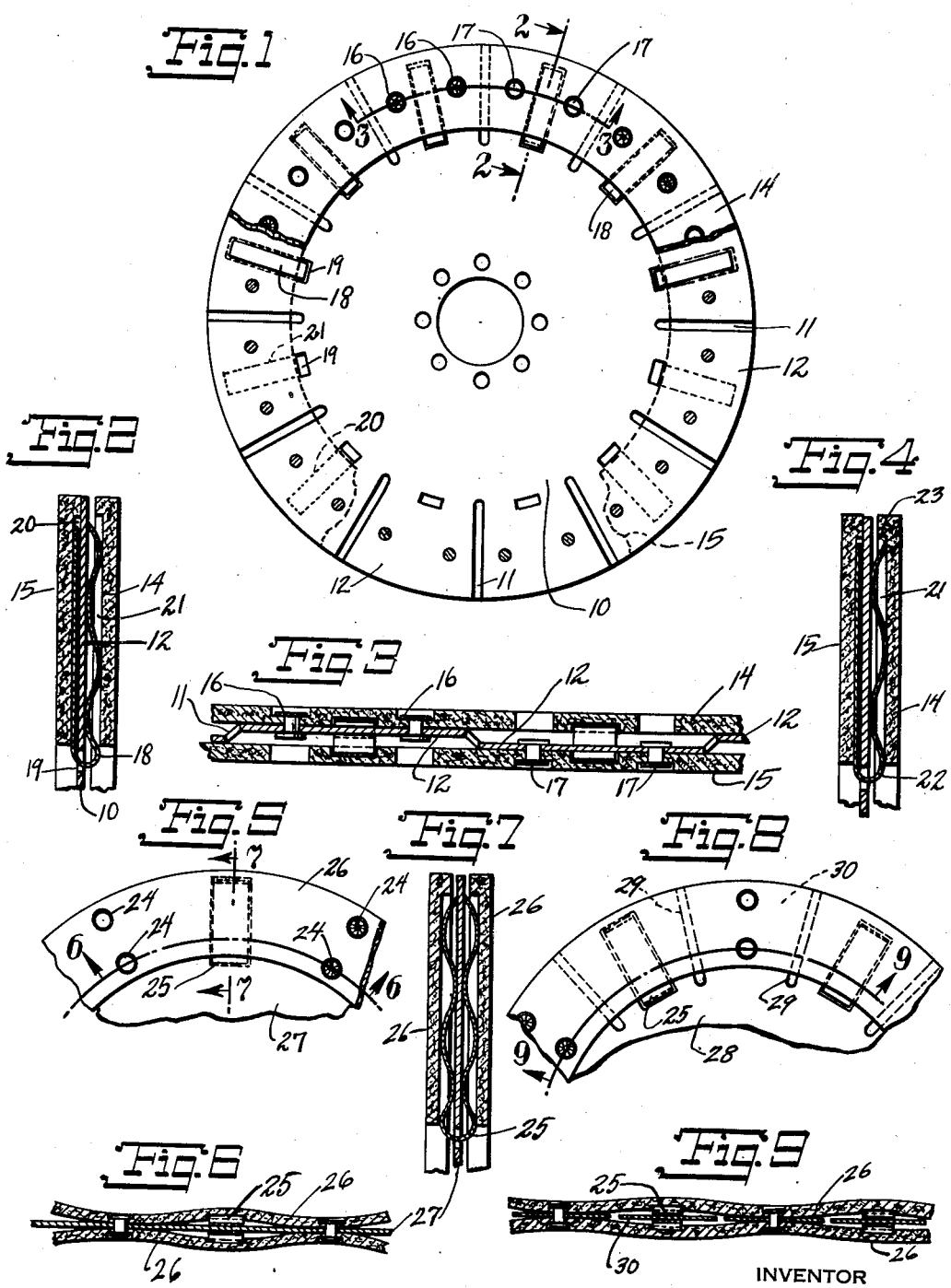

2,096,587

UNITED STATES PATENT OFFICE 2,096,587

DRIVEN MEMBER FOR FRICTION CLUTCHES

Morris Katcher, New York, N. Y.

Application May 21, 1937, Serial No. 144,071

15 Claims. (Cl. 192—107)

This invention relates to a driven member for friction clutches of the kind wherein the driven member is interposed between two parts of a driving member and is adapted to be gripped or clamped by the parts under sufficient pressure to impart motion from the driving member to the driven member. The invention is particularly desirable in a friction clutch for automobiles.

An object of this invention is to provide means which shall be sufficiently yieldable to effect gradually the friction grip between the parts of the driving member and the friction facings of the driven member. This is effected, as in my co-pending application, Serial No. 109,644, by mounting the friction facings on the driven member with springs behind the facings which normally keep them away from the faces of said member. For increasing the gradual taking hold, in one form of my device, the driven member is further constructed with two sets of spokes which are out of axial alignment with each other, and fastening the friction facings each to one set of the spokes while the springs normally keep them away from the other set. In another form, the friction member comprises a flat plate without any spokes and in still another form there are spokes but they are in the same plane.

Other objects and advantages will become apparent upon a further study of the description and drawing, in which:—

Fig. 1 is an elevation of one side of the friction clutch member with some of the springs and portions of the friction facings omitted.

Fig. 2 is a fragmental section to an enlarged scale taken along the line 2—2 of Fig. 1.

Fig. 3 is a fragmental section to an enlarged scale taken along the line 3—3 of Fig. 1.

Fig. 4 is a section taken similarly to Fig. 2 but showing an alternative form of spring.

Fig. 5 is a partial elevation of the plate member showing an alternative form in which the plate member is without spokes.

Fig. 6 is a fragmental section taken along the line 6—6 of Fig. 5.

Fig. 7 is a fragmental section taken along the line 7—7 of Fig. 5.

Fig. 8 is a partial elevation of the plate member showing an alternative form in which the plate member has spokes which are in the same plane.

Fig. 9 is a fragmental section taken along the line 9—9 of Fig. 8.

The friction member comprises a plate 10, Figs. 1, 2, 3, and 4, having slots 11 therein, which give rise to spokes 12. Spokes 12 are in two sets, the spokes of a set alternating with those of the other set. The spokes of a set are in substantially axial alignment with each other but out of axial alignment with the spokes of the other set. In Fig. 3, one spoke 12 is shown up and the adjacent one down. Friction facing 14 is fastened to the top or outer face of up spokes 12 by means of rivets 16, while friction facing 15 is fastened to the bottom or outer face of down spokes 12 by means of rivets 17. The facings are fastened to their corresponding spokes by two rivets at each spoke and are held away from the spokes to which they are not fastened by the wavy legs of hair-pin springs 18. Each spring 18 is held in position on plate 10 by having its head pass through oblong openings 19 in said plate. One leg of spring 18 is flat, while its other leg is substantially wavy shaped. Springs 18 are so placed in openings 19, that the flat leg of each spring is on the inner face of a spoke 12, which results in having the flat legs of successive springs alternately on top and on bottom of plate 10. Friction facings 14 and 15 are provided with recesses 20 on their inside to accommodate the flat legs of springs 18. Said facings are also provided on their inside with deeper recesses 21 alternating with recesses 20, to accommodate the wavy legs of said springs.

Spring 18 in Fig. 2 has the free end of its wavy leg against plate 10. In Fig. 4 another type of spring is shown as indicated by the numeral 22. Springs 22 are mounted on plate 10 in the same manner as springs 18. The free end of the wavy leg of spring 22, however is away from plate 10. In case a spring 22 should break, the free end of its wavy leg would tend to engage shoulder 23 of recess 21 and help prevent the broken part of the spring from falling out.

In Figs. 5, 6, and 7, plate 27, which is the equivalent of plate 10, Figs. 1, is flat and has no spokes. Rivets 24 are in pairs, the rivets of a pair being located along a radial line. The pairs of rivets are relatively widely spaced from each other, to allow the spring 25 located between them to bow out sufficiently the friction facings 26 from plate 27. Rivets 24 grip both facings 26, holding them to plate 27. Springs 25 have each two wavy shaped legs, so that both friction facings 26 at each spring are normally held away from plate 27.

The alternative shown in Figs. 8 and 9 is the same as that of Figs. 5, 6, and 7 except that plate 28, which is the equivalent of plate 10, Fig. 1, has slots 29 therein giving rise to spokes 30. Spokes 30 differ from spokes 12 of Fig. 1, in that they are all substantially in the same axial location instead of being offset from each other in two sets.

The advantage of having a number of waves or bends in the legs of the springs is that there is bearing with a friction facing at several places along such legs, reducing thereby the wear on the facing. The heads of the springs illustrated, curve out beyond the faces of plates 10, 27 or 28. Such shaped heads are the stiffest part of the springs, so that if they came under the facings, they would cause undue wear on the facings. In order to obviate this, the heads are passed through openings to one side of the facings. Keeping the heads to one side, also increases the effective length of the spring. Of course it can be readily understood that other shaped heads than those shown may be used. In the claims, the term "hair-pin" is applied to the springs with the understanding, however, that the legs of the springs have substantial width.

I claim:—

1. A driven member for friction clutches comprising a disc having two sets of spokes, the spokes of a set being in substantially axial alignment with each other but out of axial alignment with the spokes of the other set, a friction facing fastened to each set, the facing fastened to one set being unattached to the other set, and hair-pin springs having legs located between the facings and the spokes for normally holding each facing away from the spokes of the set to which it is unattached, each spring having its head passing through an opening in said disc, said opening being beyond the facings.

2. A driven member for friction clutches including a support having friction facings on both sides of said support, spaced means for fastening said facings to said support at intervals, and hair-pin springs in the intervals between the fastening means, the legs of the springs coming between the facings and said support on each side of said support with the heads of the springs passing through openings in said support, said legs at their free ends being separated by said support.

3. A driven member for friction clutches comprising a disc having friction facings on each side of said disc and fastened thereto, and hair-pin springs located at intervals around said disc with the legs of the springs between the facings and said disc, the heads of the springs passing through openings provided in said disc radially inward from the inner edge of said facings.

4. A driven member for friction clutches including a support having friction facings on each side of said support and fastened thereto, and springs located at intervals around said support, each spring having a pair of legs joined together by a head at one end, the legs of each spring being on opposite sides of said support, with said legs coming between the facings and said support, the heads of the springs passing through openings provided in said support beyond said facings.

5. A driven member for friction clutches comprising a disc having two sets of spokes, the spokes of a set being in substantially axial alignment with each other but out of axial alignment with the spokes of the other set, a friction facing fastened to each set, the facing fastened to one set being unattached to the other set, and hair-pin springs having their legs located between the facings and the spokes, one leg of each spring being bowed, said bowed leg being between a spoke and the facing to which it is unattached for normally holding each facing away from the spokes of the set to which it is unattached, the heads of the springs passing through openings provided in said disc beyond said facings.

6. A driven member for friction clutches comprising a disc having two sets of spokes, the spokes of a set being in substantially axial alignment with each other but out of axial alignment with the spokes of the other set, a friction facing fastened to each set, the facing fastened to one set being unattached to the other set, and hair-pin springs having their legs located between the facings and the spokes, one leg of each spring being wavy shaped, said wavy shaped leg being between a spoke and the facing to which it is unattached for normally holding each facing away from the spokes of the set to which it is unattached, the heads of the springs passing through openings provided in said disc.

7. A driven member for friction clutches comprising a disc having friction facings on each side of said disc and fastened thereto, and springs located at intervals around said disc, each spring having a pair of legs joined together by a head at one end, the legs of each spring being on opposite sides of said disc, with said legs coming between the facings and said disc, the heads of the springs passing through openings in said disc, and at least one leg of each spring being wavy shaped.

8. A driven member for friction clutches, as claimed in claim 7, in which the free end of the wavy shaped leg extends away from the face of the disc, the friction facing adjacent the wavy leg having a recess to accommodate said leg, the outer edge of said recess being spaced radially inward from the outer edge of the facing, the free end of said leg coming inside the recess.

9. A driven member for friction clutches as claimed in claim 7, in which the disc comes in between the free ends of the legs, the free end of the wavy shaped leg extending towards the face of the disc.

10. A driven member for friction clutches comprising a disc having friction facings on each side of said disc and fastened thereto, and hair-pin springs located at intervals around said disc, the legs of each spring being on opposite sides of said disc and coming between the facings and said disc, the heads of the springs passing through openings provided in said disc beyond said facings, the latter being recessed to accommodate the legs of the springs.

11. A driven member for friction clutches comprising a disc having friction facings on each side of said disc and fastened thereto, and springs located at intervals around said disc, each spring having a pair of legs joined together at one end, the legs of each spring being wavy shaped and on opposite sides of the disc, said legs coming between the facings and the disc, the junction of the legs of each of said springs passing through an opening in said disc.

12. A driven member for friction clutches comprising a disc having friction facings on each side of said disc and fastened thereto, and hair-pin springs located at intervals around said disc, the legs of the springs being on opposite sides of said disc and coming between the facings and said disc, the heads of the springs being rounded and passing through openings provided in the disc beyond said facings.

13. A driven member for friction clutches comprising a disc having friction facings on each side of said disc and fastened thereto, and hair-pin springs located at intervals around said disc, the legs of each spring being on opposite sides of said disc and coming between the facings and said disc, said legs at their free ends being separated by said support, the heads of the springs passing through substantially oblong openings provided in the disc, the length of said openings extending substantially circumferentially along the disc and being of substantially the same length as the width of the heads of the springs, and the width of said openings being substantially equal to the thickness of the springs, whereby the springs are maintained pointing in substantially radial directions.

14. A driven member for friction clutches comprising a disc having substantially annular friction facings on each side of said disc, rivets in spaced pairs for fastening the facings to the disc, the rivets of a pair being disposed radially from each other, the outer rivet of each pair being near the outer edge of the facings and the inner rivet of each pair being near the inner edge of the facings, and hair-pin springs located between the pairs of rivets, the legs of the springs being on opposite sides of said disc and coming between the facings and the disc, the heads of the springs passing through openings provided in the disc, at least one leg of each spring being wavy shaped, said leg extending radially for substantially the width of the facings.

15. A driven member for friction clutches comprising a disc having peripheral spokes, friction facings on each side of said spokes and fastened thereto, and hair-pin springs located on the spokes, the legs of the springs being on opposite faces of the spokes, said springs extending substantially radially and coming between the facings and the spokes, the heads of the springs passing through openings provided in the disc.

MORRIS KATCHER.